Patented Aug. 5, 1952

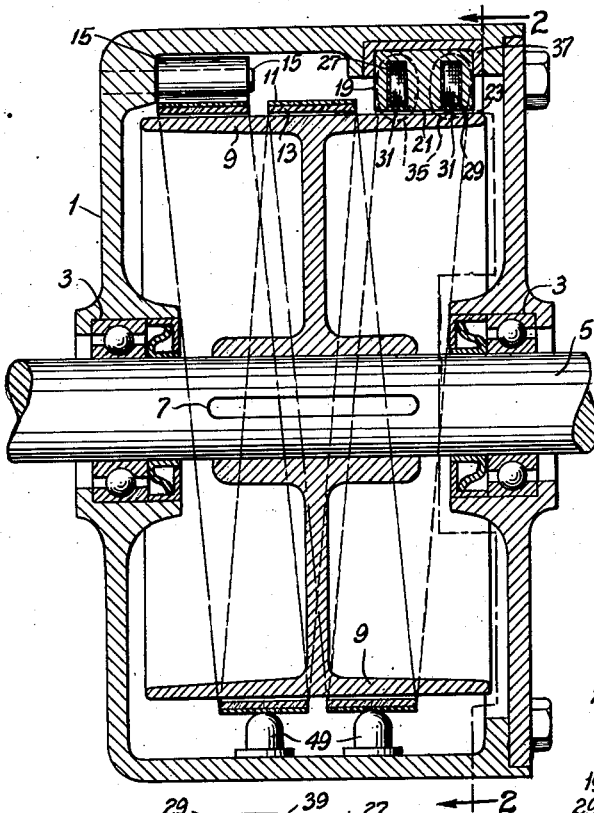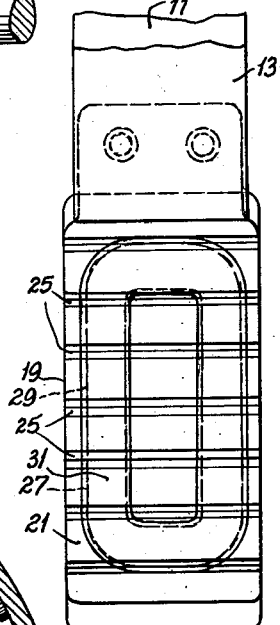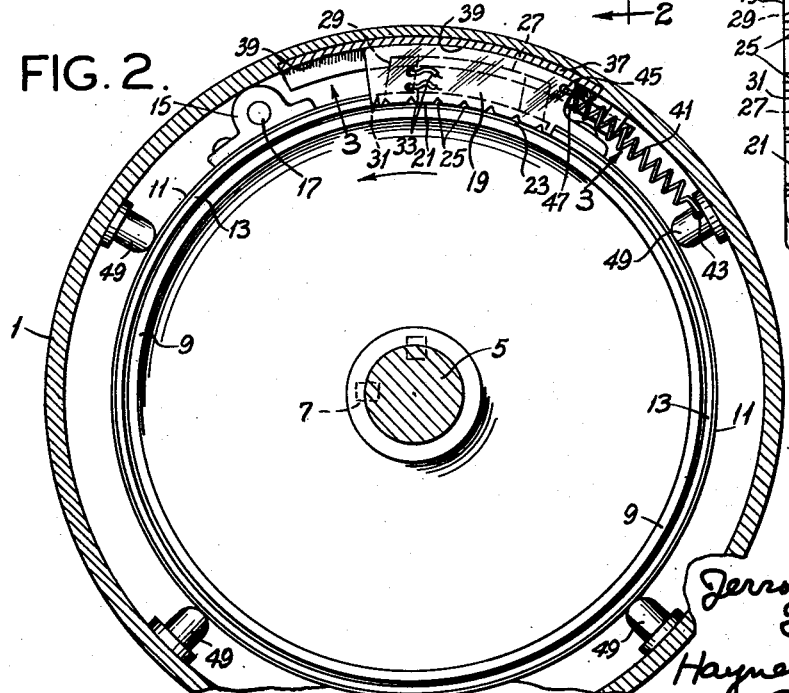

2,605,862

UNITED STATES PATENT OFFICE 2,605,862

MAGNETIC BAND BRAKE

Jerrold B. Winther, Kenosha, Wis., assignor to Martin P. Winther, Waukegan, Ill., as trustee Application May 7, 1949, Serial No. 91,985

4 Claims. (Cl. 188—137)

This invention relates to friction brakes, and more specifically to coil brakes of this class.

An object of the invention is to provide a conveniently operable coil brake primarily (though not exclusively) useful for braking and locking rotary drums in automatic transmissions and the like. Another object is to provide a brake having a substantial increase of servo braking action in addition to initial braking action. Another object is to effect a substantial brake response to an easily controlled initiating action. Other objects will be in part apparent and in part pointed out hereinafter.

Broadly, the above objects are accomplished by providing a helically coiled brake band about a magnetic brake drum, one end of the coil being anchored and the other free end normally biased away from the drum. This free end is provided with a normally demagnetized magnetic brake shoe provided with means for magnetizing it when desired. The magnetization is arranged so that the shoe (when magnetized) is attracted to the surface of the brake drum. The arrangement is also such that movement of the drum causes servo movement of the brake shoe in a direction to tighten the helical coil on the drum, thereby braking the drum motion. Means is provided such that when the brake shoe is demagnetized, it and the coil are quickly retracted from the drum promptly to release the latter.

The invention accordingly comprises the elements and combinations of elements, features of construction and arrangements of parts which will be exemplified in the structures hereinafter described, and the scope of the application of which will be indicated in the following claims.

In the accompanying drawings, in which one of various possible embodiments of the invention is illustrated, Fig. 1 is an ideal longitudinal section of apparatus embodying the invention;

Fig. 2 is a cross section taken on line 2—2 of Fig. 1; and

Fig. 3 is an enlarged cross section taken on line 3—3 of Fig. 2.

Similar reference characters indicate corresponding parts throughout the several views of the drawings.

Referring now more particularly to the drawings, there is shown at numeral 1 a stationary casing for the parts to be described. This includes bearings 3 for a shaft 5, to which is keyed as at 7 a brake drum 9. This drum is composed of magnetic material such as iron or soft steel and has a smooth cylindric exterior form. Looped around the drum 9 is a spring steel coiled brake band 11, to which is inwardly attached a brake lining 13. Attached to one end of the coil 11 is an eye 15 which, by engagement with a pin 17, forms an anchor. The pin 17 is fixed, being attached to the frame 1.

Attached to the other end of the band 11 is a brake shoe 19 which, like the brake drum 9, is composed of magnetic material such as iron or soft steel. This shoe has a curved inner face 21 which, when the brake is released, takes up a position slightly spaced from the surface of the drum 9, as indicated by the gap 23, which may be .020 inch or so. This inner surface is grooved, as shown at 25.

In the shoe 19, behind the surface 21, is formed an annular pocket 27 for receiving an annular electromagnetic coil 29. The coil is held in the pocket by a closure ring 31 which may be composed of stainless steel, brass, aluminum or the like which are nonmagnetic. Flexible leads 33 serve current to the coil. When energized, a toroidal flux field is generated, as indicated at 35, which interlinks the shoe 19 and the drum 9 (Fig. 1).

At numeral 37 is shown a nonmagnetic guide which is supported in the frame 1. A groove 39 therein serves to guide the movement of the shoe 19 in a plane vertical to the center line of the shaft 5. A tension spring 41, reacting between a fixed anchor 43 on the frame 1 and an eye 45 attached to the shoe 19, biases the shoe against a stop 47, the latter being also affixed to the frame 1. The bias is effective when the coil 29 is deenergized. Additional stops 49 are provided at intervals around the band 11, these also being affixed to the frame 1. Hence when the coil 29 is deenergized, the entire brake constituted by the shoe 19 and lined band 11 is radially expanded and totally withdrawn from the surface of the drum 9, so that there is no drag. In order to set the brake, the coil 29 is energized, thus inducing the toroidal field 35 interlinking the shoe 19 and the drum 9. This attracts the shoe to the drum, which is assumed to be rotating in the direction shown by the arrow in Fig. 2. The shoe in magnetically clinging to the drum tends to rotate with it, thus tightening up the lined spiral band 11 and contacting the liner 13 engaging the drum. Thus it will be seen that the electromagnetic brake shoe, when energized, acts to "trigger" the brake action, which thereafter is self-perpetuating or a servo action due to the motion of the drum which is being braked.

Often brake drums are operated in oily locations or even in oil baths. The purpose of the grooves 25 is (under such conditions) to allow oil to escape from the drum surface when under magnetic pressure the shoe is brought against it, so that a more frictional metal-to-metal contact will follow. This assures that the shoe will be effectively dragged by the drum rotation so as to ensure prompt gripping by the brake band 11, 13.

For operating the brake, it is only necessary to close the circuit to the coil, whereupon the brake shoe is magnetically attracted and attached to the drum, which peripherally drags the shoe to coil the brake band, which in turn brakes the drum. The brake initiating action may be modulated to some extent by supplying various exciting currents to the coil up to a value to produce magnetic saturation of the field 35, the latter giving the fastest and strongest brake setting.

To release the brake, the current is turned off, whereupon the shoe loses its magnetic properties and is drawn away from the drum 9 and against the stop 47 by spring 41. This also uncoils the brake band 11, 13, bringing it against the stops 49 and clear of the drum 9. The materials of the drum 9 and shoe 19 are chosen so as to have low residual magnetism to ensure prompt and quick release.

Although the drawings show a construction wherein the coil has practically two loops, it is to be understood that other numbers of loops may be used, the greater numbers corresponding to greater servo braking effect. In an actual embodiment of the brake, wherein the diameter of the brake drum was 8 inches, a triple-looped brake band has produced a braking capacity in lbs. ft. of the order of eight times the drag by the brake shoe alone. This figure is an example of the multiplication of effort brought about by the construction. It will thus be apparent that the exciting current for coil 29 needs not to be high.

The braking action, once initiated by excitation of the coil 29, will build up rapidly. At high drum speeds this may amount to a violent braking action and the apparatus is therefore most useful in cases where the drum speed is relatively low, such as various brake drums that are used in shifting speeds of planetary and other gear trains.

The purpose of the member 37 is to act as a guide for any peripheral movement of the brake shoe 19 but to prevent any substantial axial movement of it. This member also limits movement of the shoe away from the drum when it is retracted by the spring 41. Thus the magnetic gap 23 is kept at a small value across which it is feasible to drive the magnetic field 35 with a reasonable magnetomotive force in the coil 29. The member is preferably nonmagnetic in order to reduce stray leakage of flux from the coil 29.

It will be noted that the position of the annular coil 29 is such that its axis and the axis of the toroidal flux field 35 is substantially normal to the surface of the drum 9, which concentrates the flux across the gap in the most advantageous manner. Also the inner shape of the shoe is concentric with the drum surface when engaged for most efficient attachment when the coil 29 is energized.

Although the invention has been described in connection with a moving drum 9, it will be understood that the drum may be stationary and the system of parts carried by the frame 1 rotated in the opposite direction and a braking effect obtained thereon. This constitutes a mere inversion. Moreover, the stated system connected with the frame 1 may rotate and the drum 19 also rotate in an overtaking direction, in which event when the brake is set, both rotary systems are brought to the same speed. In this event, the device might be called a clutch, but the term brake is to be understood to refer to such a system, because the action is still a braking action wherein one part is brought to a stationary relationship with respect to the other when the brake is set.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A brake comprising a magnetic drum, a flexible helical brake band enveloping the drum, one end of said band being anchored, a brake shoe attached to the other end of the brake band, an electromagnet associated with the brake shoe adapted when excited to produce a flux field interlinking the shoe and the drum, stop means limiting motions of the shoe and brake band away from the drum, an element biasing the shoe and the brake band toward said stop means when the magnet is deenergized, said stop means including a guide permitting peripheral but preventing axial movement of the brake shoe and serving to limit retraction of the shoe from the drum to a small spacing across which the toroidal flux field of said electromagnet may readily be driven.

2. In combination, a magnetic drum and a band anchoring member which are relatively rotary, a band comprising a strip of springy material having a friction lining coiled around the drum, said band being anchored at one end to said anchoring member, an electromagnetic shoe attached to the other end of the band and inherently biased outward away from the drum by the inherent springiness of the band, said shoe, when energized, being adapted magnetically to cling to the drum, and means guiding the shoe for peripheral movement but restraining it from axial movement and limiting its outward movement to a small spacing from the drum consistent with magnetic attraction of the shoe to the drum.

3. A brake comprising a magnetic brake drum, a band comprising a strip of springy material having a friction lining coiled around the drum and anchored at one end, an electromagnetic shoe attached to the other end of the band and inherently biased outward away from the drum by the inherent springiness of the band, said shoe, when energized, being adapted magnetically to cling to the drum, and means guiding the shoe for peripheral movement but restraining it from axial movement and limiting its outward movement to a small spacing from the drum consistent with magnetic attraction of the shoe to the drum.

4. A brake comprising a magnetic brake drum, a band comprising a strip of springy material having a friction lining coiled around the drum and anchored at one end, an electromagnetic shoe attached to the other end of the band and inherently biased outward away from the drum by the inherent springiness of the band, said shoe, when energized, being adapted magnetically to cling to the drum, a fixed guide having a groove in which the shoe is slidable peripherally of the drum, the guide restraining the shoe from axial movement and limiting its outward movement to a small spacing from the drum consistent with magnetic attraction of the shoe to the drum, a spring connected to the shoe to bias it peripherally of the drum in band-releasing direction, and a stop limiting the motion of the shoe in the band-releasing direction.

JERROLD B. WINTHER.

REFERENCES CITED

The following references are of record in the file of this patent:

UNITED STATES PATENTS

| Number | Name | Date |
|---|---|---|
| 1,101,370 | Williams | June 23, 1914 |
| 1,447,837 | Normanville | Mar. 6, 1923 |
| 1,886,692 | Kapitza et al. | Nov. 8, 1932 |
| 1,919,760 | Wood | July 25, 1933 |

FOREIGN PATENTS

| Number | Country | Date |
|---|---|---|
| 359,788 | France | Feb. 2, 1906 |
| 291,769 | Germany | Apr. 28, 1914 |